United States Patent
Kawai et al.

(10) Patent No.: US 10,222,780 B2
(45) Date of Patent: Mar. 5, 2019

(54) CONTROL DEVICE FOR MACHINE TOOL

(71) Applicant: MAKINO MILLING MACHINE CO., LTD., Tokyo (JP)

(72) Inventors: Rie Kawai, Aiko-gun (JP); Hideki Heishi, Aiko-gun (JP); Kenichi Ono, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 11 days.

(21) Appl. No.: 15/318,890

(22) PCT Filed: Jun. 19, 2014

(86) PCT No.: PCT/JP2014/066313
§ 371 (c)(1),
(2) Date: Dec. 14, 2016

(87) PCT Pub. No.: WO2015/194010
PCT Pub. Date: Dec. 23, 2015

(65) Prior Publication Data
US 2017/0146978 A1    May 25, 2017

(51) Int. Cl.
*G05B 19/402* (2006.01)
*G05B 19/4063* (2006.01)

(52) U.S. Cl.
CPC ....... *G05B 19/4063* (2013.01); *G05B 19/402* (2013.01); *G05B 2219/25229* (2013.01)

(58) Field of Classification Search
CPC .............. G05B 19/402; G05B 19/4063; G05B 2219/25229
See application file for complete search history.

(56) References Cited

U.S. PATENT DOCUMENTS

| 8,907,990 B2 * | 12/2014 | Yanase | G06F 3/0481 345/667 |
| 9,720,529 B2 * | 8/2017 | Tae | G06F 3/041 |
| 2010/0180197 A1 * | 7/2010 | Ohashi | G06F 17/212 715/256 |
| 2010/0305758 A1 * | 12/2010 | Nishi | B23Q 17/00 700/264 |

(Continued)

FOREIGN PATENT DOCUMENTS

| CN | 101898318 | 12/2010 |
| CN | 103827801 | 5/2014 |

(Continued)

OTHER PUBLICATIONS

International Search Report dated Sep. 16, 2014, directed to International Application No. PCT/JP2014/066313, 2 pages.

*Primary Examiner* — Abdelmoniem I Elamin
(74) *Attorney, Agent, or Firm* — Morrison & Foerster LLP

(57) ABSTRACT

A control device for a machine tool, said control device being provided with a display unit that displays machining information and a display control unit that generates an image to display on said display unit. The display control unit is designed so as to divide up the display region of the display unit, generating a plurality of subregions. Via input from an operator, the sizes of said subregions can be changed. The display control unit changes the display format of the machining information in accordance with the machining information to be displayed and the sizes of the subregions.

4 Claims, 15 Drawing Sheets

(56) References Cited

U.S. PATENT DOCUMENTS

| | | | | |
|---|---|---|---|---|
| 2011/0025719 | A1* | 2/2011 | Yanase | G06F 3/0481 345/667 |
| 2013/0067400 | A1* | 3/2013 | Jitkoff | G06F 3/04883 715/800 |
| 2013/0076287 | A1* | 3/2013 | Iwashita | G05B 19/4068 318/561 |
| 2013/0338809 | A1* | 12/2013 | Kume | G05B 19/4155 700/97 |
| 2013/0338814 | A1* | 12/2013 | Uchida | G05B 19/18 700/180 |
| 2014/0022086 | A1* | 1/2014 | Tezuka | B23Q 17/00 340/680 |
| 2014/0100688 | A1* | 4/2014 | Tezuka | G05B 19/404 700/186 |
| 2014/0244024 | A1* | 8/2014 | Tezuka | G05B 19/188 700/180 |

FOREIGN PATENT DOCUMENTS

| | | |
|---|---|---|
| EP | 0 034 506 | 8/1981 |
| EP | 1 580 632 | 9/2005 |
| JP | 1-310403 | 12/1989 |
| JP | 3-104205 | 10/1991 |
| JP | 4-158404 | 6/1992 |
| JP | 5-27819 | 2/1993 |
| JP | 6-262436 | 9/1994 |
| JP | 6-332521 | 12/1994 |
| JP | 9-120352 | 5/1997 |
| JP | 11-231918 | 8/1999 |
| JP | 2000-66709 | 3/2000 |
| JP | 2008-234148 | 10/2008 |
| JP | 2009-116157 | 5/2009 |
| JP | 2010-152882 | 7/2010 |
| JP | 2010-238045 | 10/2010 |
| JP | 2011-34568 | 2/2011 |
| JP | 2014-44454 | 3/2014 |

* cited by examiner

CONTROL DEVICE FOR MACHINE TOOL

CROSS-REFERENCE TO RELATED APPLICATIONS

This application is a U.S. National Stage patent application of International Patent Application No. PCT/JP2014/066313, filed Jun. 19, 2014, which is hereby incorporated by reference in the present disclosure in its entirety.

FIELD OF THE INVENTION

The present invention relates to a control device of a machine tool.

BACKGROUND OF THE INVENTION

In a conventional technique, machine tools which perform machining such as cutting by moving a tool with respect to a workpiece are known. Moreover, in such machine tools, a numerical control-type machine tool which specifies a tool path using coordinates of a predetermined feed axis or the like and performs machining by moving the tool with respect to the workpiece is known. The machine tool automatically performs machining by moving at least one of the workpiece and the tool in accordance with a command from a control device and thereby changing a relative position of the tool with respect to the workpiece.

In the numerical control type machine tool, information on a machining program in which the relative position of the tool with respect to the workpiece is determined and the tool and the like are inputted in advance into the control device. The control device of the machine tool performs machining of the workpiece based on such information. The machine tool is provided with a display device for displaying machining information which is information on machining. The operator can input a machining condition and the like while observing the display device prior to machining of the workpiece. During a workpiece machining period, a machining state and a state of the machine tool are displayed on the display device. The operator can continue machining of the workpiece while confirming such states. Alternatively, while the display device is studied, a workpiece inspection condition can be inputted and an inspection result can be confirmed.

Japanese Unexamined Patent Publication No. 2000-66709A discloses a display device of an NC machine tool which comprises a display part, a base storage part which stores a plurality of display patterns in which a display area is plurally partitioned, and a display item storage part which stores display items. It is disclosed that the display device displays a display item as predetermined on the display part using the predetermined display patterns based on set data in which a display item to be actually displayed in the display area is set.

Japanese Unexamined Patent Publication No. 2010-152882A discloses a display device for a machine tool which displays a plurality of partitioned pictures on a screen with respect to display items and a display size as selected by the operator, which corresponds to the display size based on display information of a partitioned picture storage area.

CITATIONS LIST

Patent literature 1: Japanese Unexamined Patent Publication No. 2000-66709A

Patent literature 2: Japanese Unexamined Patent Publication No. 2010-152882A

SUMMARY OF THE INVENTION

The machine tool can machine the workpiece into various shapes by changing the machining program. Since a workpiece machining method changes in accordance with progress of machining, a current progress state of the machining program can be preferably confirmed during the workpiece machining period. In addition, a state of a load applied to the machine tool and the like can be also preferably confirmed during the workpiece machining period. Further, prior to machining the workpiece, reference points of various coordinate systems and types of various tools are set in the machining program. The reference points of the various coordinate systems and the types of the various tools can be also preferably confirmed prior to machining of the workpiece.

There are plenty of machining information which is useful when confirmed during the workpiece machining period or prior to or following machining. The display device in Japanese Unexamined Patent Publication No. 2000-66709A as described above is formed in such a manner as to be capable of selecting an item to be displayed on a partitioned screen obtained by partitioning the screen. However, in the display device, the patterns of the display area are needed to be registered as a template, and when the size of the display area is changed, reselection of the template is needed. When the template is changed, the template and a display item are needed to be selected in advance in a setting picture and stored in the storage part. In other words, there is a problem that a picture having the size as desired cannot be displayed unless after the completion of the setting.

Further, there is a problem that since the size of a picture is determined in advance in accordance with the template, the size of a picture as partitioned may differ from the size desired by the operator and characters are reduced so that the picture is difficulty studied.

It is an object of the present invention to provide a control device of a machine tool in which machining information is displayed on a screen using a display format easily grasped by the operator.

SOLUTION TO PROBLEM

First control device of a machine tool according to the present invention is a control device of a machine tool which machines a workpiece by relatively moving a tool and the workpiece, the control device of the machine tool comprising a display part which displays machining information associated with machining of the workpiece, and a display control part which generates an image to be displayed on the display part. The display control part is formed in such a manner as to generate a plurality of partition areas by partitioning a display area of the display part and allow the machining information to be displayed in the partition areas. The partition area has a size capable of being changed in accordance with an operation by an operator. The display control part changes a display format of the machining information in accordance with the size of the partition area and the machining information as displayed.

In the invention as described above, it is possible that the machining information displayed in the partition area includes current position information of a feed axis, the current position information includes at least one of a coordinate value of a machine coordinate system, a coordinate value of an absolute coordinate system, a coordinate value of a relative coordinate system, and a remaining movement amount, and the display control part displays a current position image containing the current position information in the partition area.

In the invention as described above, it is possible that when the size of the partition area in which the current position image is displayed is changed, the display control part changes a character size to the maximum character size allowing all of coordinate values of one coordinate system to be displayed, and when a lateral width of the partition area is smaller than a width allowing all of the coordinate systems to be displayed, the display control part changes display of the coordinate systems from one row to two rows, and further, when the lateral width of the partition area is smaller than a width allowing all of coordinate values in first row to be displayed, the display control part reduces the character size until all of the coordinate values in the first row are displayed in the partition area.

In the invention as described above, it is possible that the control device of the machine tool comprises a storage part which stores information on display of the display part, the display control part can change a partition method of the display area of the display part and a kind of the machining information displayed in the partition area, the storage part stores plural pieces of picture setting information including the partition method of the display area of the display part and the kind of the machining information, and the display control part switches a picture based on the plural pieces of picture setting information through operation of a switch button by the operator.

In the invention as described above, it is possible that the control device of the machine tool comprises a storage part which stores information on display of the display part, the display control part can change a partition method of the display area of the display part and a kind of the machining information displayed in the partition area, the storage part stores plural pieces of picture setting information including the partition method of the display area of the display part and the kind of the machining information, and the display control part switches a picture based on the plural pieces of picture setting information through a code command of the machining program.

Second control device of a machine tool according to the present invention is a control device of a machine tool which machines a workpiece by relatively moving a tool and the workpiece, the control device of the machine tool comprising a display part which displays machining information associated with machining of the workpiece and a display control part which generates an image to be displayed on the display part. The display control part generates a plurality of partition areas by partitioning a display area of the display part in accordance with a predetermined number of partitions, and displays a splitter at a border between the partition areas. The display control part allows a current position image containing current position information of a feed axis to be displayed. The partition area has a size capable of being continuously changed by moving the splitter through a touch panel or a pointing device. The current position information includes at least one of a coordinate value of a machine coordinate system, a coordinate value of an absolute coordinate system, a coordinate value of a relative coordinate system, and a remaining movement amount. When the size of the partition area in which the current position image is displayed is changed, the display control part changes a character size or the number of the coordinate systems to be displayed in one row in accordance with the size of the partition area.

According to the present invention, the control device of the machine tool in which machining information is displayed on a screen using a display format easily grasped by the operator can be provided.

DETAILED DESCRIPTION OF THE INVENTION

With reference to FIG. 1 to FIG. 16, a control device of a machine tool according to an embodiment will be described. A machine tool according to the present embodiment is of a numerical control type in which machining is performed by automatically relatively moving a tool and a workpiece based on a machining program.

Figure 1:
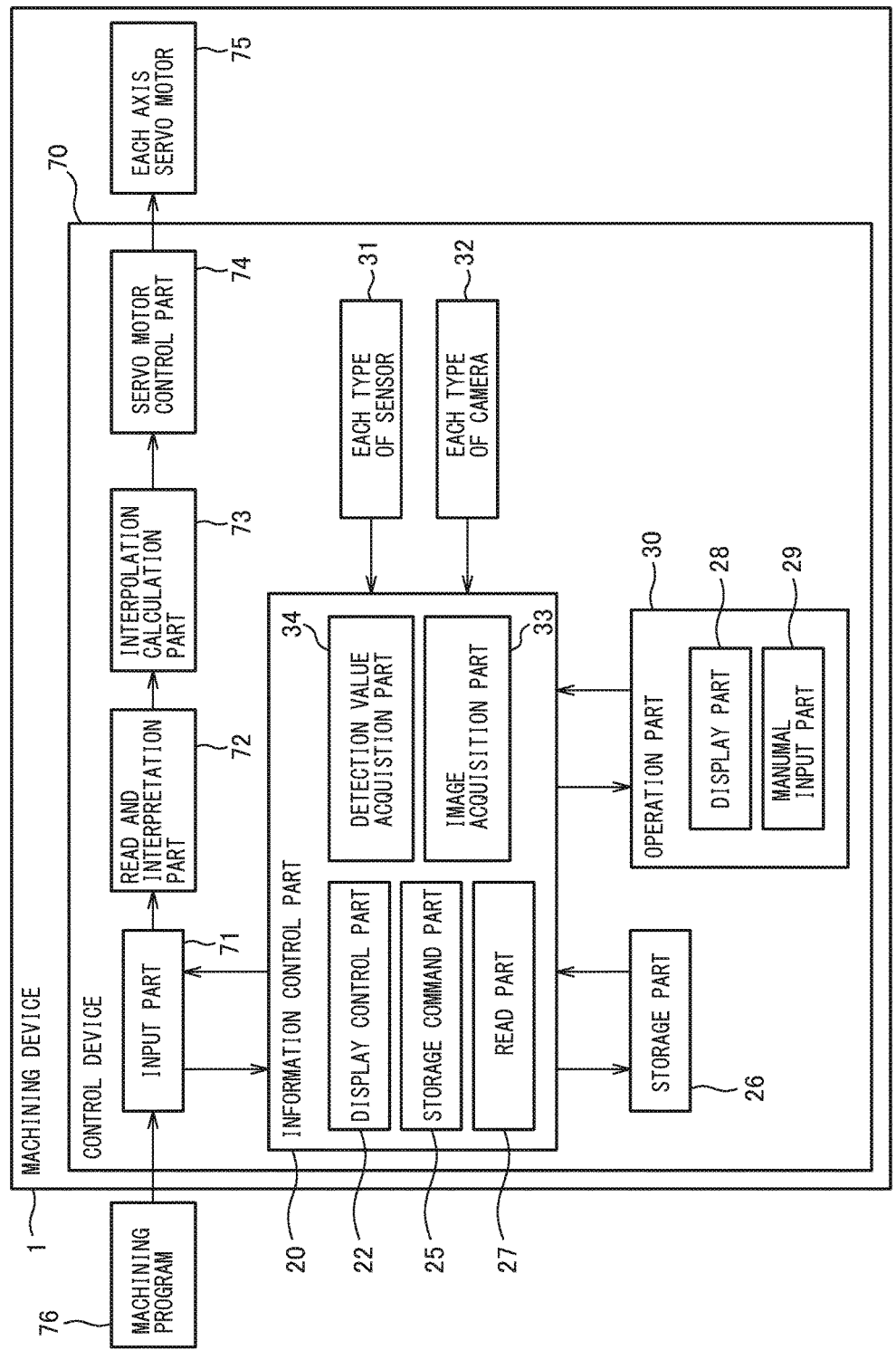
FIG. 1 is a block diagram of a machine tool.

FIG. 1 shows a block diagram of the machine tool according to the present embodiment. A machine tool 1 comprises a control device 70 which performs a control of a movement device of each feed axis. The control device 70 is configured, for example, by a CPU (central processing unit), a RAM (random access memory), a ROM (read only memory), and the like which are connected to each other via a bus.

The control device 70 includes an input part 71, a read and interpretation part 72, an interpolation calculation part 73, and a servo motor control part 74. When machining is performed by the numerical control type machine tool 1, a machining program 76 is prepared in advance. The machining program 76 can be generated based on a workpiece target shape by a CAM (computer aided manufacturing) device or the like. The workpiece target shape can be created, for example, by a CAD (computer aided design) device.

The machining program 76 is inputted into the input part 71. The machining program 76 contains information on a relative movement of the tool with respect to the workpiece. In the machining program 76, a command toward the machine tool is described by a code command such as a G code and an M code.

The read and interpretation part 72 reads the machining program 76 from the input part 71. The read and interpretation part 72 transmits a movement command to the interpolation calculation part 73. The interpolation calculation part 73 calculates a position command value for each interpolation cycle. For example, the interpolation calculation part 73 calculates a movement amount for each time interval as set based on the movement command. The interpolation calculation part 73 transmits the position command value to the servo motor control part 74. The servo motor control part 74 calculates a movement amount of each feed axis, such as X axis, Y axis, and Z axis based on the position command value and drives a each axis servo motor 75.

The control device 70 according to the present embodiment includes an information control part 20 which controls machining information associated with machining of the workpiece and an operation part 30 which inputs and displays the machining information and the like. The information control part 20 receives the machining information for performing machining at this time from the input part 71 and transmits the same to the input part 71. For example, the information control part 20 can edit the machining program 76 inputted into the input part 71 and transmit the same as the machining program of machining at this time to the input part 71. The operation part 30 includes a display part 28 which displays the machining information and a manual input part 29 for inputting the machining information and changing a display of the display part 28 by the operator.

The control device 70 includes a storage part 26 which stores the machining information. The storage part 26 may be, in addition to the ROM and the RAM as described above, a storage device such as a memory card and a hard disk which are connected via a communication interface.

The information control part 20 includes a storage command part 25 and a read part 27. The storage command part 25 allows the storage part 26 to store information as newly inputted and information as changed. The read part 27 reads the information stored in the storage part 26.

The information control part 20 includes a display control part 22 which controls an image displayed on the display part 28. The control device 70 according to the present embodiment includes a each type of camera 32 as an image capture device. The information control part 20 includes an image acquisition part 33. The image acquisition part 33 acquires an image captured by each type of camera 32 and transmits the same to the display control part 22. Further, the control device 70 includes each type of sensor 31 mounted to the machine tool. A sensor for detecting a rotational speed and a sensor for detecting a load on a spindle which are mounted to each axis servo motor 75, and the like can be illustrated as each type of sensor 31. The information control part 20 includes a detection value acquisition part 34. The detection value acquisition part 34 acquires an output of each type of sensor 31 and transmits the same to the display control part 22.

Figure 2:
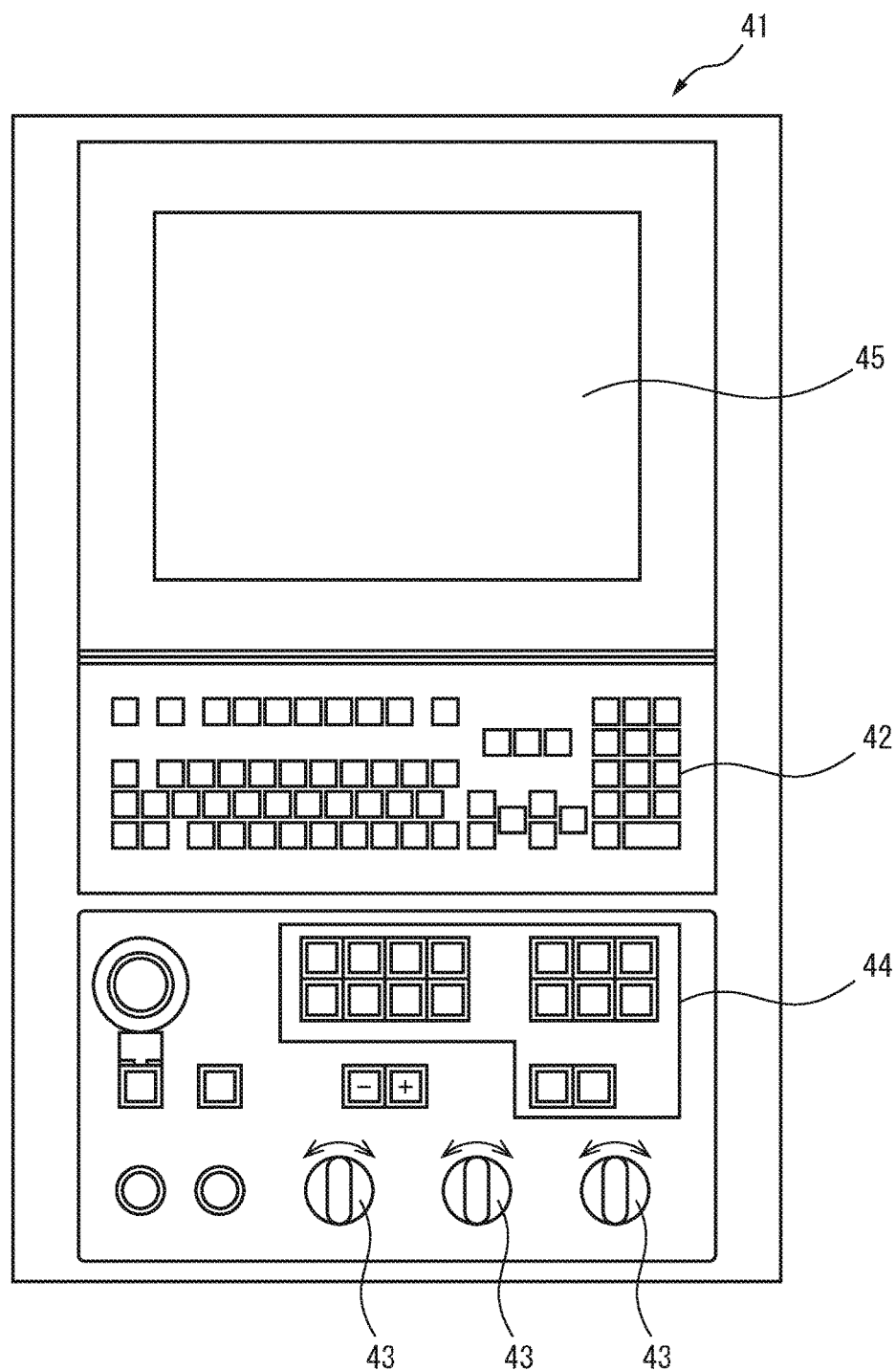
FIG. 2 is a schematic front view of an operation panel of the machine tool.

FIG. 2 shows a schematic front view of an operation panel disposed in the control device of the machine tool. With reference to FIG. 1 and FIG. 2, an operation panel 41 corresponds to the operation part 30 of the control device 70. The operation panel 41 includes a display panel 45 with which display and input of the machining information are performed. For the display panel 45 according to the present embodiment, a touch panel type capable of selecting a desired section by touching a screen is employed. Accordingly, the display panel 45 functions as the display part 28 and the manual input part 29 of the control device 70. Note that the device which specifies an arbitrary position in the screen is not limited to such a configuration, and a pointing device such as a mouse, a joystick, or a touch pad may be employed in place of the touch panel type display part.

The operation panel 41 includes a key input part 42. In the key input part 42, a plurality of key switches are arranged. By pushing the key switches of the key input part 42, predetermined numbers and characters can be inputted. Further, the operation panel 41 includes an operation switch part 44 which performs selection of a predetermined operation and an override setting part 43 which sets an override value. The override setting part 43 can set, for example, an override value of a rotational speed of the spindle, an override value of a feed rate of machining, and the like. The key input part 42, the operation switch part 44, and the override setting part 43 function as the manual input part 29.

Figure 3:
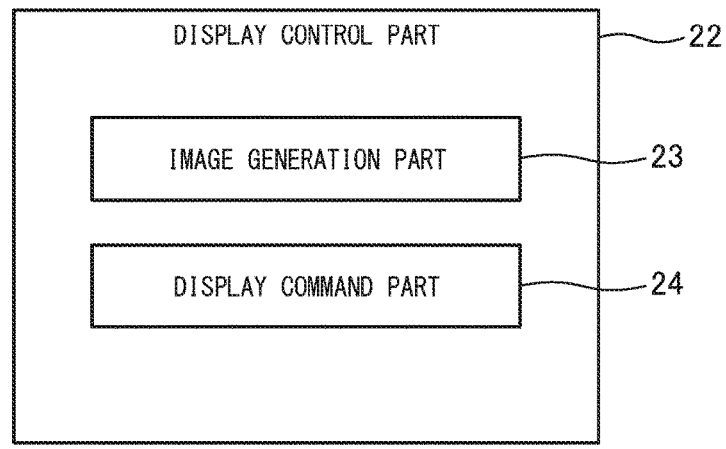
FIG. 3 is a block diagram of a display control part.

FIG. 3 shows a block diagram of the display control part. The display control part 22 includes an image generation part 23 which generates an image to be displayed on the display part 28. The image generation part 23 detects an operation by the operator and generates an image based on the operation by the operator. The display control part 22 includes a display command part 24 which transmits to the display part 28 a command for displaying the image generated by the image generation part 23. The display part 28 displays the image based on the command from the display command part 24.

Figure 4:
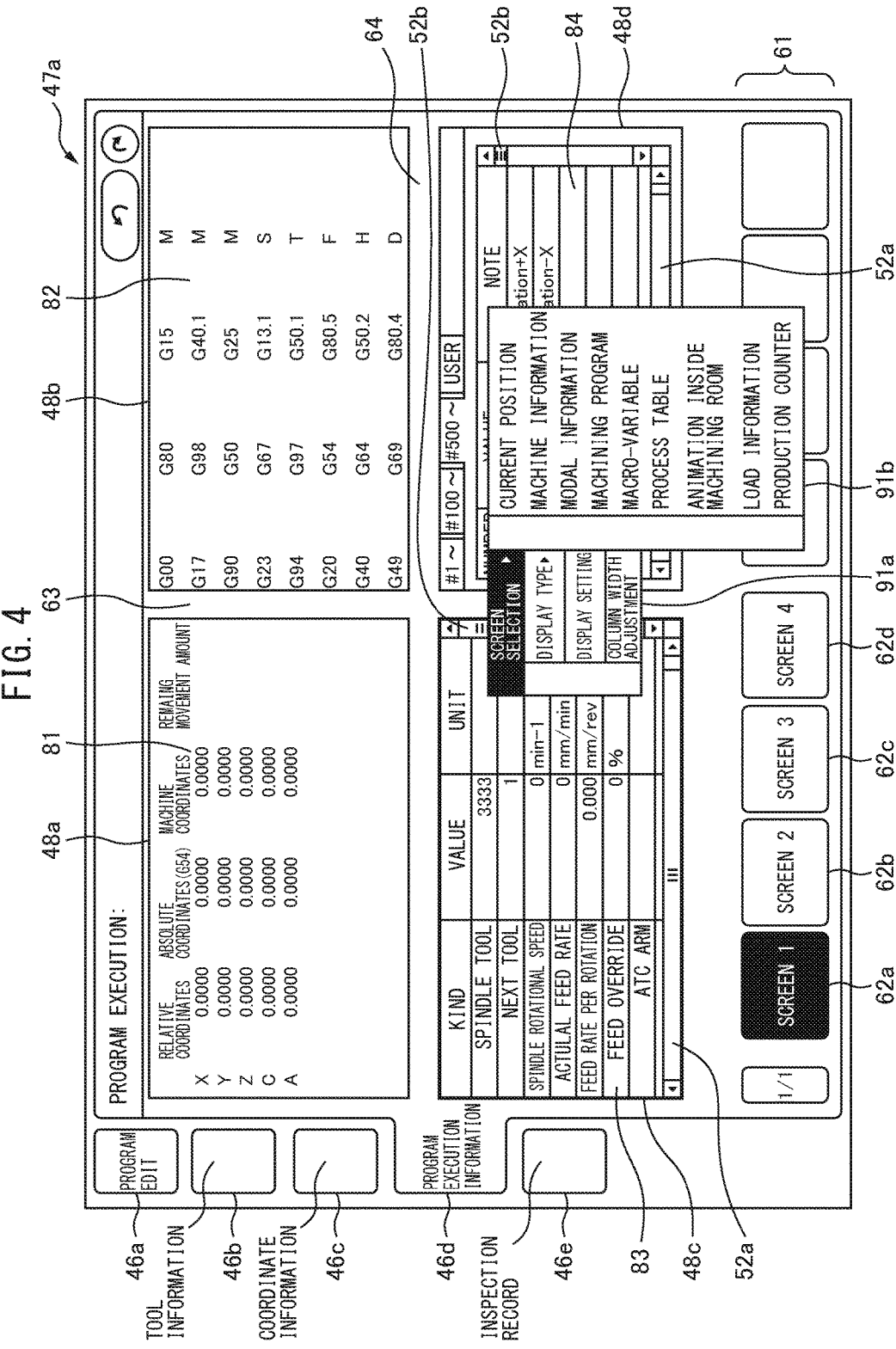
FIG. 4 is first execution information picture according to an embodiment.

FIG. 4 shows first execution information picture among pictures displayed on the display panel of the operation panel. The execution information picture is a picture displayed during a period in which the machining program is executed. In the execution information picture, an image containing a workpiece machining state and a state of the machine tool is displayed. Tabs 46a-46e for selecting display content are arranged on the left side of first execution information picture 47a. By selecting the tab 46d, the first execution information picture 47a is displayed. In a lower side area of the execution information picture 47a, a button area 61 is formed. In the button area 61, switch buttons 62a-62d capable of switching from first selection picture to fourth selection picture are arranged. In an example as illustrated in FIG. 4, the switch button 62a is selected so that the first selection picture is displayed.

The execution information picture is formed in such a manner that a plurality of partition areas can be displayed by partitioning a display area of the display part 28. In the execution information picture, one piece of machining information is displayed in one partition area. In the example as illustrated in FIG. 4, the execution information picture 47a is horizontally partitioned by a splitter 63 as a partition line, and further, the execution information picture 47a is vertically partitioned by a splitter 64 as a partition line. As a result, in the execution information picture 47a, first partition area 48a, second partition area 48b, third partition area 48c, and fourth partition area 48d are formed.

In the respective partition areas 48a-48d, the machining information as predetermined can be displayed. In the example as illustrated in FIG. 4, first auxiliary picture 91a is displayed by long pushing a machine information image 83 inside the partition area 48c on the touch panel. In a case of the mouse, the first auxiliary picture 91a is displayed by pushing a right button instead of long pushing the machine information image 83. In the auxiliary picture 91a, items for changing display information in the partition areas 48a-48d are displayed. By selecting the item of "picture selection" in the auxiliary picture 91a, second auxiliary picture 91b is displayed.

The machining information capable of being displayed in the execution information picture 47a according to the present embodiment is indicated in the auxiliary picture 91b. The machining information as desired can be displayed in the partition areas 48a-48d by selecting the machining information as desired in the auxiliary picture 91b.

In the first partition area 48a, a current position image 81 containing current position information is displayed. The current position information is coordinate system information associated with a relative position of the tool with respect to the workpiece. In the second partition area 48b, a modal information image 82 containing modal information is displayed. The modal information is information on a modal code for maintaining a predetermined state by a code command executed by the machine tool. In the machine tool, the current modal code which maintains the state is kept until a command for changing the state is executed by another code command of the same group.

In the third partition area 48c, the machine information image 83 containing machine information is displayed. The machine information is information on a current machine tool operation state such as the rotational speed of the spindle. In the fourth partition area 48d, a macro-variable information image 84 containing macro-variable information is displayed. The macro-variable information is information on macro-variables used in the machine program.

The machining information capable of being displayed in the execution information picture includes, in addition thereto, the machining program. The machining program is displayed in a machining program image formed using a character string.

Further, the machining information capable of being displayed in the execution information picture includes a process table on machining. The process table is displayed in a process table image formed in a table format. The machining program contains information on the tool to be used and a subprogram. In the process table image, the process table in which such information is aligned in a time series is displayed.

In addition, the machining information capable of being displayed in the execution information picture includes machining room animation. The machining room animation is displayed in a machining room animation image. The machining room animation image is a schematic diagram in which a state inside a machining room is seen from a desired direction at desired image angle and distance.

Moreover, the machining information capable of being displayed in the execution information picture includes load information of the machine tool. The load information is information on a load applied to the machine tool during a workpiece machining period. The load information is displayed in a load information image. The load can be detected, for example, based on electric power supplied to the servo motor. In the load information image, the load applied to the spindle can be displayed in a graph or a diagram.

Further, the machining information capable of being displayed in the execution information picture includes production counter information. The production counter information is information on the number of articles of the workpiece having a desired shape as manufactured. The production counter information can be displayed in a production count information image.

The machining information capable of being displayed in the execution information picture is not limited to such configurations, and arbitrary information on machining of the workpiece can be displayed. For example, tool information associated with the tool and inspection information associated with inspection of the workpiece among the machining information may be displayed.

Thus, the partition areas 48a-48d displayed in the execution information picture are selected, and in the partition areas 48a-48d as selected, arbitrary machining information can be displayed. Note that in the example as illustrated in FIG. 4, machining information different from each other is displayed in the four partition areas 48a-48d, but such a configuration is not limitative and the same machining information may be displayed in the plural partition areas.

Figure 5:
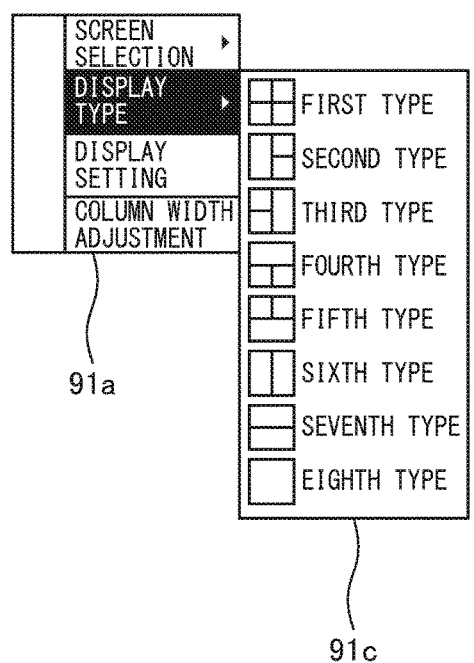
FIG. 5 illustrates auxiliary pictures for setting partition method of an execution information picture.

FIG. 5 shows auxiliary pictures for selecting a method of partitioning a picture of the display part. In the example as illustrated in FIG. 4, the picture of the display part is equally partitioned into four pieces, but such a configuration is not limitative and the other number of partitions and the other directions of partitions can be employed. Second auxiliary picture 91c is displayed by selecting the item of "display type" in the first auxiliary picture 91a. In the auxiliary picture 91c, selection among combinations of the number of partitions and directions of partitions from first type to an eighth type can be optionally made. In the example as illustrated in FIG. 4, the first type according to which the picture is partitioned into four pieces is selected. In addition, the picture can be partitioned into three pieces as illustrated in the second type to the fifth type. Further, the picture can be partitioned into two pieces as illustrated in the sixth type and the seventh type. Moreover, in the eighth type, one piece of the machining information can be displayed in the picture without partitioning the picture.

Note that in the present embodiment, a configuration is made such that the picture is partitioned into four pieces at the maximum, but such a configuration is not limitative and a configuration may be made such that the picture can be partitioned into further more partition areas.

Next, among the machining information capable of being displayed in the execution information picture, the current position image in which the current position information is displayed will be described. With reference to FIG. 4, in the first partition area 48a, the current position image 81 is displayed. There are cases in which a plurality of coordinate systems are used when machining is performed in accordance with the machining program. In the current position image 81, the plurality of coordinate systems and a remaining movement amount are displayed. In the respective coordinate systems, current coordinate values during the workpiece machining period are displayed. The remaining movement amount indicates movement amount remaining with respect to a target position in each axis. The remaining movement amount is a value associated with a coordinate value in a coordinate system and will be described hereinafter, assuming that the remaining movement amount is also one coordinate system.

As the coordinate systems, in addition to a machine coordinate system, a relative coordinate system in which an arbitrary point specified by the operator is set as a reference point and an absolute coordinate system in which the origin of a workpiece coordinate system as predetermined is set as a reference point can be illustrated. Furthermore, a handle interrupt coordinate system based on an amount of movement in which a table and the tool are moved while maintaining each coordinate system value using a manual pulse generation device of the operation part can be illustrated. Further, in a case of the machine tool having a rotation axis, a feature coordinate system which is a coordinate system used for an inclined surface machining command and the like, in which the machine coordinate system is made to perform the movement including a rotational movement, can be illustrated. The coordinate systems are not limited to such configurations, and an arbitrary coordinate system can be employed.

Figure 6:
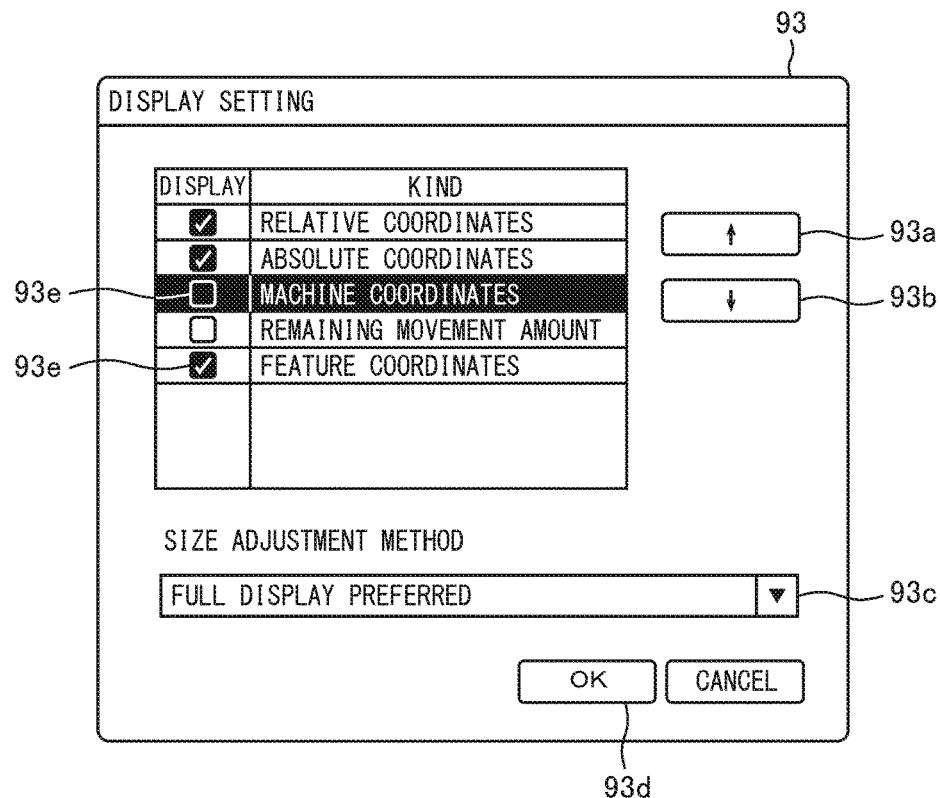
FIG. 6 illustrates an auxiliary picture for setting display items and a display method of a current position image.

FIG. 6 shows an auxiliary picture for setting items to be displayed in the current position image and a display method. In the current position image 81, a coordinate system to be displayed can be selected among the plurality of coordinate systems. With reference to FIG. 4 and FIG. 6, second auxiliary picture 93 is displayed by selecting the item of "display setting" in the first auxiliary picture displayed by long pushing the inside of the first partition area 48a. The coordinate systems to be displayed in the current position image 81 can be selected by pushing selection columns 93e. The order of the coordinate systems to be displayed can be changed by pushing buttons 93a, 93b.

Figure 7:
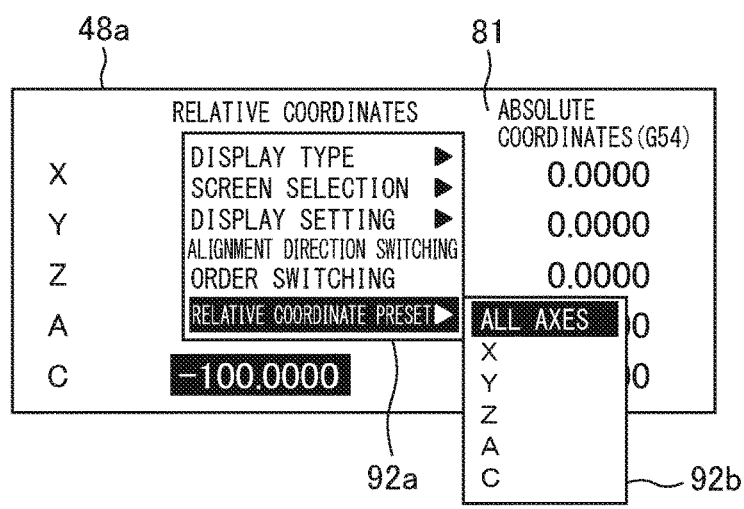
FIG. 7 illustrates the current position image in which auxiliary pictures for selecting a content of the display items are displayed.

FIG. 7 shows the current position image in which auxiliary pictures for selecting a display content of the coordinate systems is displayed. In the current position image 81, with respect to the coordinate systems in which the display content can be selected, the display content can be changed. By long pushing a relative coordinate in the current position image 81, first auxiliary picture 92a is displayed. Second auxiliary picture 92b is displayed by selecting the item of "relative coordinate preset" in the auxiliary picture 92a. In the auxiliary picture 92b, an axis which serves as a basis of the relative coordinate system can be selected. The coordinate values of the relative coordinate system are displayed based on the axis as selected. Thus, with respect to each coordinate system, a display content can be also changed.

In the control device according to the present embodiment, setting in advance a kind of the machining information to be displayed in the partition areas using a dedicated setting picture is not needed, and while a screen display for actual used is observed, the first auxiliary picture and the second auxiliary picture are called and switching to the machining information as desired can be made. Further, the first auxiliary picture and the second auxiliary picture are called and a display order and a display content can be also changed while the screen is observed. Such a configuration allows the operator to easily make a change into his favorable display format.

Note that when images displayed in two partition areas are changed and then displayed, an auxiliary picture is displayed and a kind of the machining information can be changed. Alternatively, in the control device according to the present embodiment, an image in one partition area is moved into the other partition area while maintained to be pushed, whereby positions of two images can be changed.

Figure 8:
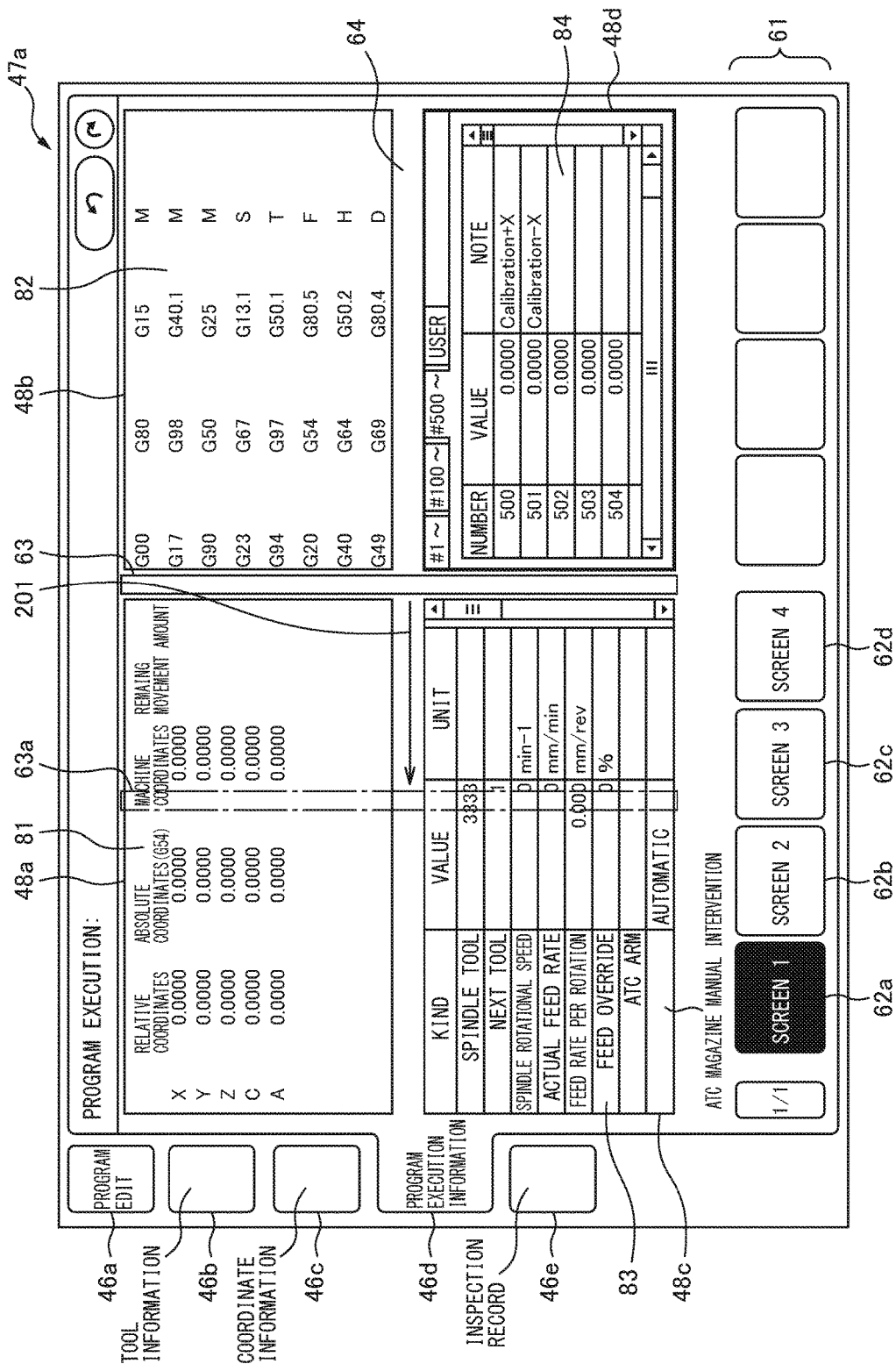
FIG. 8 is an explanatory diagram of first step for changing the size of partition areas of the first execution information picture.

FIG. 8 shows the first execution information picture prior to changing the size of the partition areas. The execution information picture 47a is formed in such a manner as to be capable of continuously changing the size of each of the partition areas 48a-48d. While a longitudinal center portion of the splitter 63 is maintained to be pushed, a finger is moved as indicated by an arrow 201, whereby the splitter 63 can be moved to a position indicated by a splitter 63a. In accordance with a movement of the splitter 63, the size of the partition areas 48a-48d continuously changes. In a case of the mouse, a cursor is placed on the splitter 63, the left button is pressed, and drag is performed, whereby the size of the partition areas 48a-48d can be continuously changed.

Figure 9:
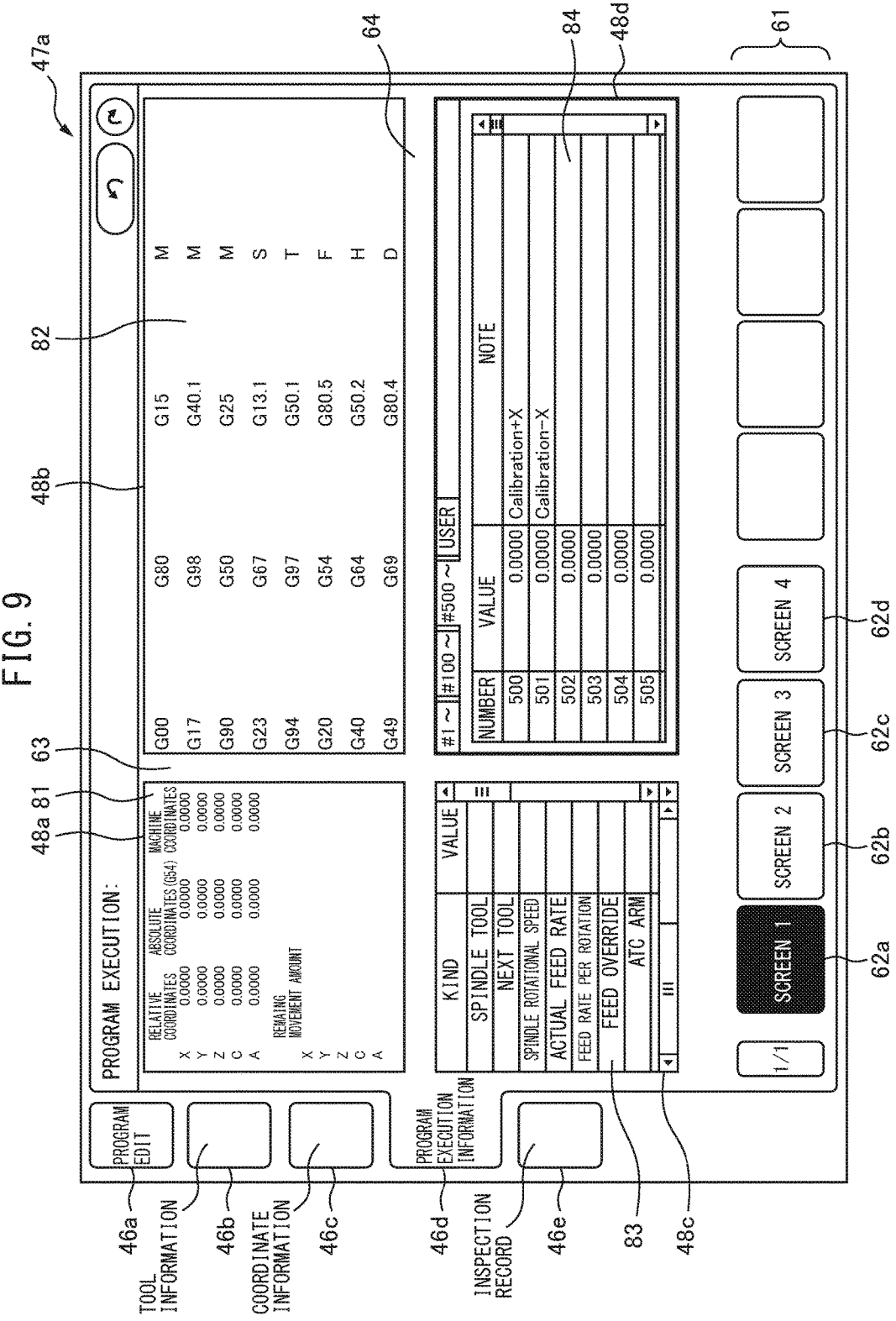
FIG. 9 is an explanatory diagram of second step for changing the size of the partition areas of the first execution information picture.

FIG. 9 illustrates the first execution information picture after changing the size of the partition areas. The splitter 63 is moved so that the first partition area 48a and the third partition area 48c are reduced. On the other hand, the second partition area 48b and the fourth partition area 48d are enlarged. The partition areas 48a-48d can be changed into the arbitrary size. Similarly, also in the splitter 64, while a longitudinal center portion of the splitter 64 is maintained to be pushed, a finger is vertically moved, whereby the splitter 64 is moved and the size of the partition areas can be changed.

In addition, while a longitudinal center portion of an area sandwiched between the first partition area 48a and the second partition area 48b in the splitter 63 is pushed, a finger is horizontally moved. Such an operation allows only a size ratio of the first partition area 48a to the second partition area 48b to be changed. Further, while a longitudinal center portion of an area sandwiched between the third partition area 48c and the fourth partition area 48d in the splitter 63 is pushed, a finger is horizontally moved, thereby allowing only a size ratio of the third partition area 48c to the fourth partition area 48d to be changed. Such a configuration allows the size ratio of the first partition area 48a to the second partition area 48b and the size ratio of the third partition area 48c to the fourth partition area 48d to be different from each other. Similarly, also in the splitter 64 which horizontally extends, a size ratio of the first partition area 48a to the third partition area 48c and a size ratio of the second partition area 48b to the fourth partition area 48d can be changed.

Thus, the operator can move the partition lines disposed between the partition areas to arbitrary positions. Then, the size ratios of the partition areas can be continuously changed. In other words, the size of the partition areas can be continuously changed in accordance with an operation by the operator. Consequently, setting in advance the size of the partition areas is unneeded, and further, while the screen of the display part is observed, the size of the partition areas can be adjusted into the size as desired. The operator can change the size of the partition areas to the size easy to use through a simple operation.

Note that the current position image 81 is composed of characters. Further, the number of the coordinate systems contained in the current position image 81 can be optionally set. Consequently, there are cases in which if the partition areas are reduced, a part of the coordinate systems protrudes out of the partition areas and the characters are reduced to be difficult to be read. Then, the display control part according to the present embodiment continuously changes a display format of the current position image in accordance with the size of the partition areas and a kind of the current position information as displayed.

Figure 10:
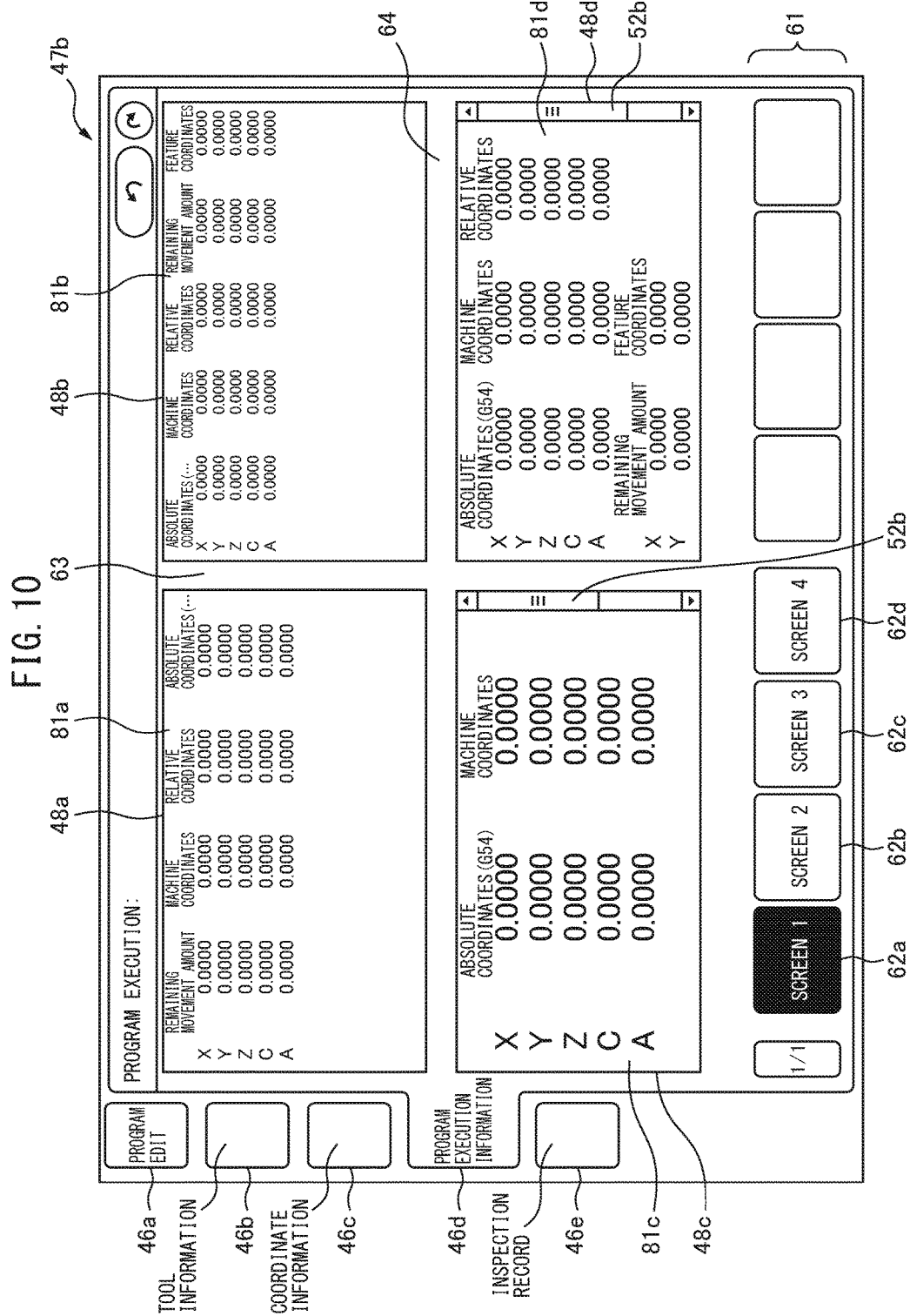
FIG. 10 is second execution information picture according to the embodiment.

FIG. 10 shows second execution information picture in which the machining information displayed in the four partition areas of the first execution information picture is changed to the current position information in order to illustrate the display format of the current position image. In all the partition areas 48a-48d of the second execution information picture 47b, current position images 81a-81d are displayed. The current position image 81a in the first partition area 48a and the current position image 81c in the third partition area 48c are set to display four coordinate systems. On the other hand, the current position image 81b in the second partition area 48b and the current position image 81d in the fourth partition area 48d are set to display five coordinate systems. The current position images 81c, 81d fail to be contained inside the partition areas 48c, 48d, scroll bars 52b which vertically move the images are displayed, and the current position images 81c, 81d are moved, whereby coordinate systems as hidden can be seen. The scroll bars 52b are displayed at a side end portion of the partition areas.

A configuration is made such that in the current position image according to the present embodiment, the operator can select two display methods. With reference to FIG. 6, at a lower portion of the auxiliary picture 93, a button 93c is disposed. By pushing the button 93c, a display method of the current position image 81 can be selected. The display method according to the present embodiment includes two display methods which are composed of a display method in which full display is preferred and a display method in which a character size is preferred. The operator can select either one of the two display methods.

With reference to FIG. 10, the current position images 81a, 81b are displayed according to the display method in which full display is preferred. In the display method in which full display is preferred, the character size and the number of rows for display are adjusted such that coordinate values of all the plurality of coordinate systems are displayed in the partition areas 48a, 48b. When there are a plurality of display formats capable of displaying coordinate values of all the coordinate systems, a display format allowing the character size to be the largest is employed.

The current position images 81c, 81d are displayed according to the display method in which the character size is preferred. In the display method in which the character size is preferred, adjustment is made so that characters are enlarged under a condition in which all the coordinate values of one coordinate system are displayed in the partition areas 48c, 48d. Then, when the entirety of the images fails to be contained in the partition areas, the coordinate systems are configured to be in a plurality of rows. Without displaying scroll bars which horizontally move the images, the scroll bars 52b which vertically move the images are displayed.

With reference to FIG. 2, in the key input part 42 of the operation panel 41, a page-up key and a page-down key for moving one page are disposed. Herein, a portion of the image which is displayed inside the partition areas among images to be displayed corresponds to one page. By pushing such buttons, the image can be ascended and descended by a movement amount of one page. Alternatively, a movement of one page can be made by once pushing buttons displayed at upper and lower sides of the scroll bars 52b which vertically move the images.

Then, the size of the current position images is adjusted such that coordinate values of all the coordinate systems can be seen by one pushdown of the page-up key or one pushdown of the page-down key. For example, when the current position images are too large and three-time operations of the page-down key are needed, the images are reduced. In the present embodiment, the plurality of coordinate systems are configured to be in two rows, thereby the images satisfying such conditions is generated. When there are a plurality of display formats capable of generating the current position images under such conditions, a display format allowing the character size to be the largest is selected.

In the third partition area 48c, the current position image 81c is enlarged and displayed so that all the coordinate values of the absolute coordinate system are displayed. All the coordinate values of the machine coordinate system are displayed in the partition area 48c, whereas the relative coordinate system and the absolute coordinate system are not displayed. Accordingly, display of the coordinate systems is changed to be in two rows. Then, the scroll bars 52b are displayed. One pushdown of the page-down key enables displaying the coordinate values of the relative coordinate system and the coordinate values of the absolute coordinate system.

In the fourth partition area 48d, the five coordinate systems are displayed, whereas, if the current position image 81d is enlarged so that all the coordinate values of the absolute coordinate system are displayed, the coordinate systems are in three rows. In such a case, one operation of the page-down key fails to allow all the coordinate systems to be seen. Consequently, the coordinate systems are displayed in two rows in the current position image 81d and reduced so that the coordinate values of all the coordinate systems in the first row are displayed in the partition area 48d. In other words, the character size of the current position image 81d is configured to be smaller than the character size of the current position image 81c.

Note that when the coordinate systems are in two rows, such a control that the number of the coordinate systems in the first row and the number of the coordinate systems in second row are close is preferable. Such a control allows the character size to be large. For example, in the fourth partition area 48d, the current position image in which five kinds of coordinate systems are set is displayed. If the number of the coordinate systems are three rather than four in the first row, a display width of the coordinate systems in the first row is reduced so that the character size can be enlarged. As a result, the operator easily confirms the coordinate values.

Figure 11:
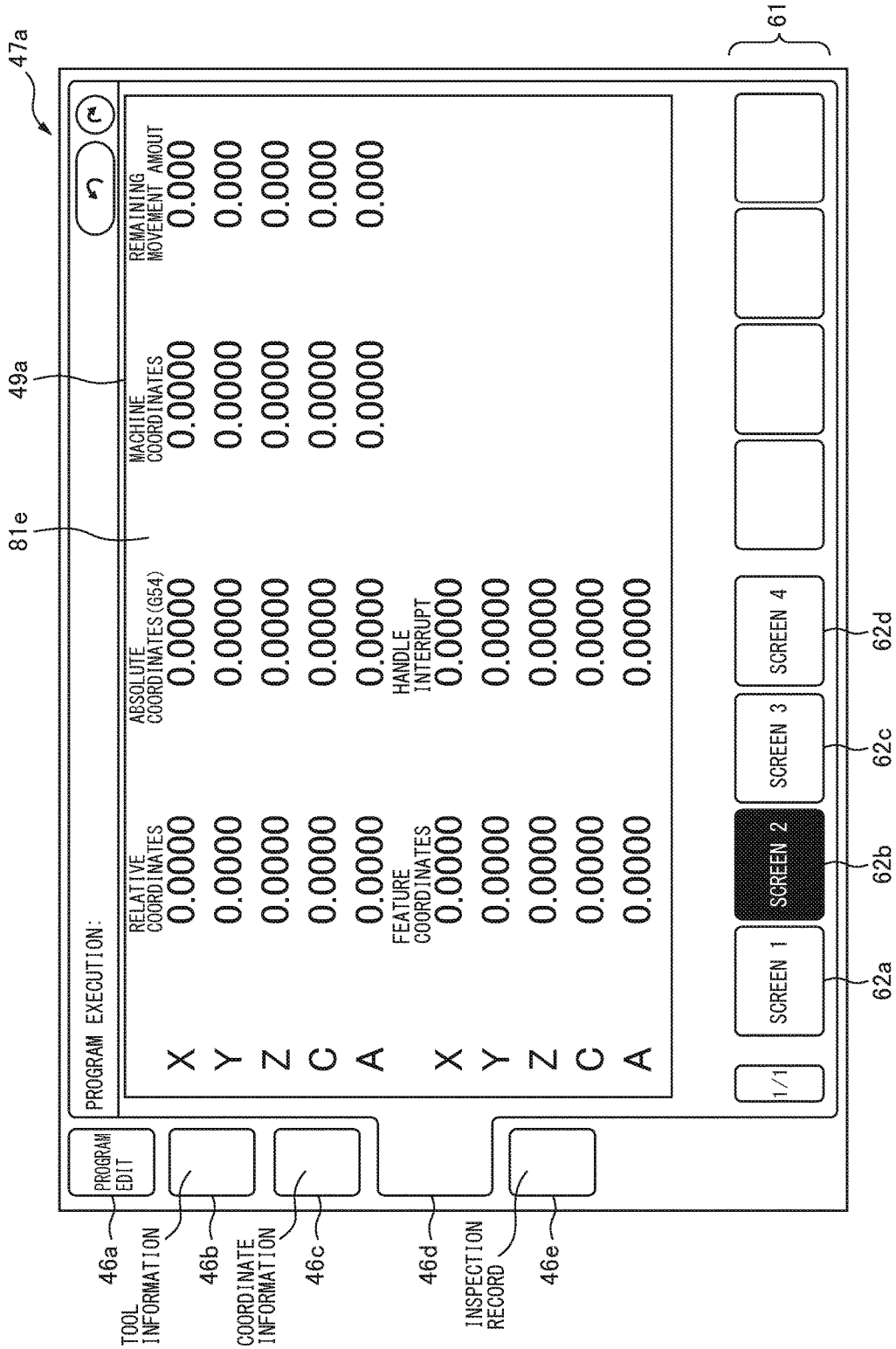
FIG. 11 is third execution information picture according to the embodiment.

FIG. 11 shows third execution information picture according to the present embodiment. In third execution information picture 47c, the partition areas are not formed, but on the screen of the display part, a current position image 81e is displayed. In the current position image 81e, the six coordinate systems are displayed. Further, the display method in which full display is preferred is selected. When full display is preferred, there are cases in which if the number of the coordinate systems as displayed increases, the character size is reduced, which makes confirmation difficult. Thus, when the character size is further enlarged if the coordinate systems are displayed in plural rows rather than in one row, the coordinate systems are displayed in plural rows. For example, in the current position image 81e, the plurality of coordinate systems are displayed in two rows. Compared with the case in which the plurality of coordinate systems are displayed in one row, the character size is further enlarged and the coordinate values are easily confirmed.

Note that when either of the display method in which full display is preferred and the display method in which the character size is preferred is selected, if the partition areas are set to be small so that the character size becomes below a predetermined lower limit value, such a control as to set the character size to be the lower limit value and reduce information to be displayed may be performed.

Thus, in the control device according to the present embodiment, when the current position information is displayed in the execution information picture in the partition areas, the display format can be changed in such a manner as to be easily seen by the operator in accordance with an operation of enlarging or reducing the partition areas. In changing the display format, the number of rows in which the coordinate systems are displayed can be adjusted, and further, enlarging or reducing the current position image, i.e. adjusting the character size can be performed. By such a control, the image easily seen by the operator is displayed and the operator can easily confirm current coordinate values.

In particular, during the workpiece machining period, coordinate values of the coordinate systems change. Accordingly, preferably, all the coordinate values of the coordinate systems can be confirmed through a small number of screen operations. In the display method in which full display is preferred, the coordinate values of all the coordinate systems can be displayed at one time so that the operator can confirm the coordinate values without performing a screen operation.

In the display method in which the character size is preferred, a control in which the character size is enlarged is performed so that when the operator operates away from the operation panel, for example, when the operator operates to move the feed axis by the portable type manual pulse generation device while looking into the machining room, a matter in which characters at a distant position are so small that the image is difficulty confirmed can be avoided.

Figure 12:
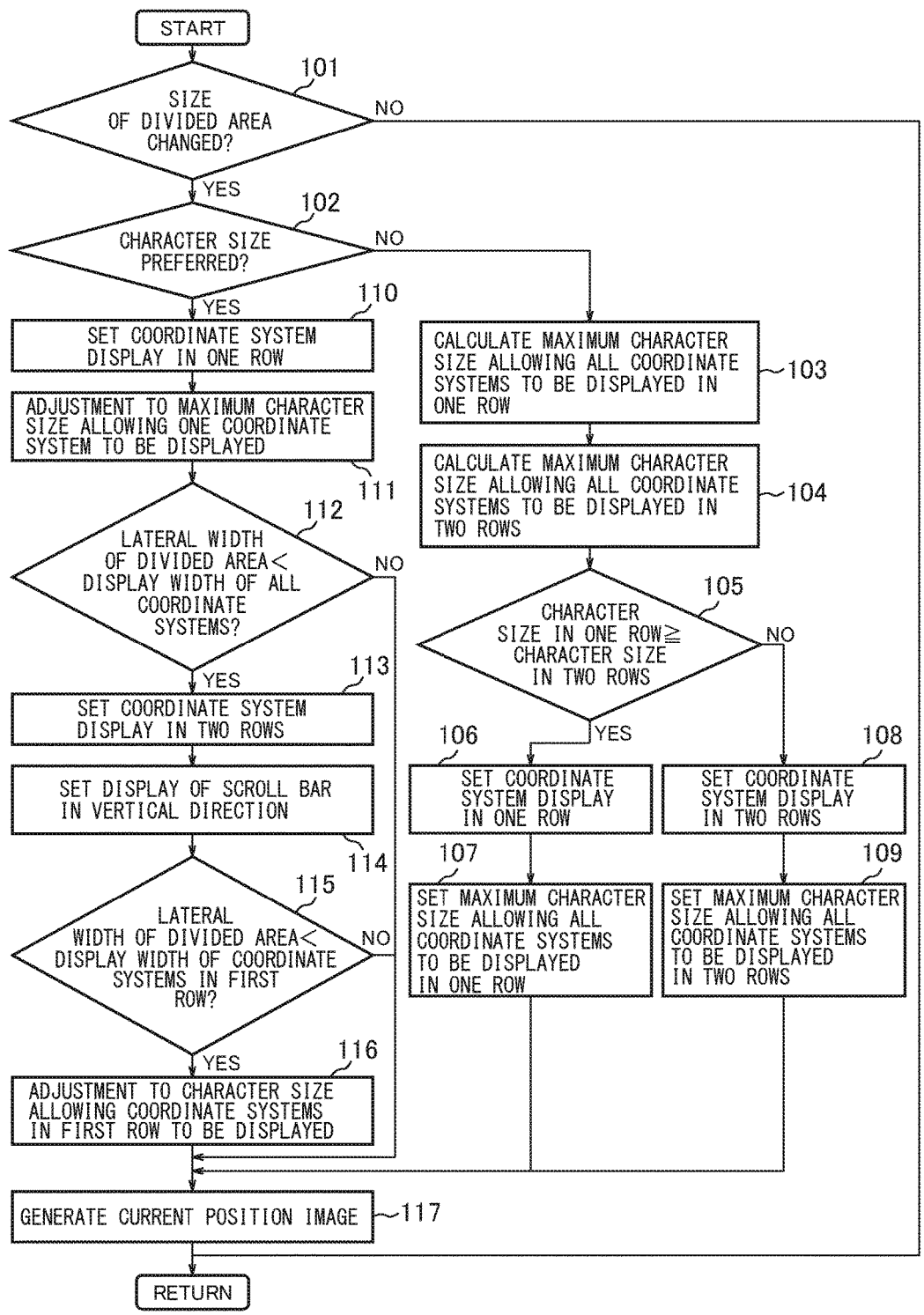
FIG. 12 is a flowchart of a control to set a display format of the current position image.

FIG. 12 shows a flowchart of a control to generate the current position image. With reference to FIG. 3, in the present embodiment, the image generation part 23 of the display control pat 22 judges the size of the partition area and the character size so as to generate the current position image.

In step 101, it is judged whether or not a size of the partition area in which the current position image is displayed is changed. In the present embodiment, it is judged whether or not the size of the partition area is changed by moving the splitters 63, 64.

In step 101, when the size of the partition area is not changed, this control is terminated and a current display format is maintained. Note that when a picture displayed in the partition area is changed and firstly the current position image is displayed, step 101 is omitted and the control can be started from step 102. In step 101, when the size of the partition area in which the current position image is displayed is changed, the process proceeds to step 102.

In step 102, the display method as set in advance is judged. In step 102, when the display method in which the character size is preferred is not selected, the process proceeds to step 102. In such a case, the display method in which full display is preferred is selected.

In step 103, the maximum character size when all the coordinate systems are displayed in one row in the partition area is calculated. In step 104, the maximum character size when all the coordinate systems are displayed in two rows in the partition area is calculated.

In step 105, the character size when all the coordinate systems are displayed in one row and the character size when all the coordinate systems are displayed in two rows are compared. In such a control, the number of rows allowing the character size to be larger is selected. In step 105, if the character size when all the coordinate systems are displayed in one row is larger than or equal to the character size when all the coordinate systems are displayed in two rows, the process proceeds to step 106.

In step 106, such setting as to display all the coordinate systems in one row is made. In step 107, the maximum character size when all the coordinate systems are displayed in one row is set. Then, the process proceeds to step 117.

In step 105, if the character size when all the coordinate systems are displayed in two rows is larger than the character size when all the coordinate systems are displayed in one row, the process proceeds to step 108. Then, in step 108, such setting as to display all the coordinate systems in two rows is made. In step 109, the maximum character size when all the coordinate systems are displayed in two rows is set.

On the other hand, in step 102, when the display method in which the character size is preferred is selected, the process proceeds to step 110. In step 110, such setting as to display all the coordinate systems in one row is made. In step 111, the maximum character size is set when all the coordinate values of one coordinate system are displayed in the partition area.

Next, in step 112, it is judged whether or not a lateral width of the partition area is smaller than a display width when all the coordinate systems are displayed. When the lateral width of the partition area is larger than or equal to the display width when all the coordinate systems are displayed, all the coordinate systems can be displayed in one row. In such a case, the process proceeds to step 117.

In step 112, when the lateral width of the partition area is less than the display width when all the coordinate systems are displayed, the process proceeds to step 113. In such a case, if all the coordinate systems are displayed in one row, a part protrudes out of the partition area. In step 113, display of all the coordinate systems is set to be in two rows. In step 114, such setting as to display the scroll bar which vertically moves is made.

Next, in step 115, it is judged whether or not the lateral width of the partition area is smaller than the display width of the coordinate systems in the first row. In other words, it is judged whether or not coordinate values of all the coordinate systems arranged in the first row in the partition area are displayed. In step 115, when the lateral width of the partition area is larger than or equal to the display width of the coordinate systems in the first row, the process proceeds to step 117.

In step 115, when the lateral width of the partition area is smaller than the display width of the coordinate systems in the first row, the process proceeds to step 116. In step 116, the image is reduced to the character size allowing all the coordinate systems in the first row to be displayed. By such a control, all the coordinate systems in the first row are displayed in the partition area, and further, by once pushing the page-down button, the coordinate values of all the coordinate systems can be displayed in the partition area.

In step 117, the current position image is generated based on the character size and the number of rows as set. The current position image generated by the image generation part 23 of the display control part 22 is transmitted by the display command part 24 to the display part 28, and the display part 28 displays the current position image as transmitted.

The control to generate the current position image as illustrated in FIG. 12 can be repeated over each predetermined time interval. Note that also when the partition area is not generated, one current position image is displayed in the whole display area of the display part (see FIG. 11), a control similar to that in steps 102-129 can be performed.

Figure 13:
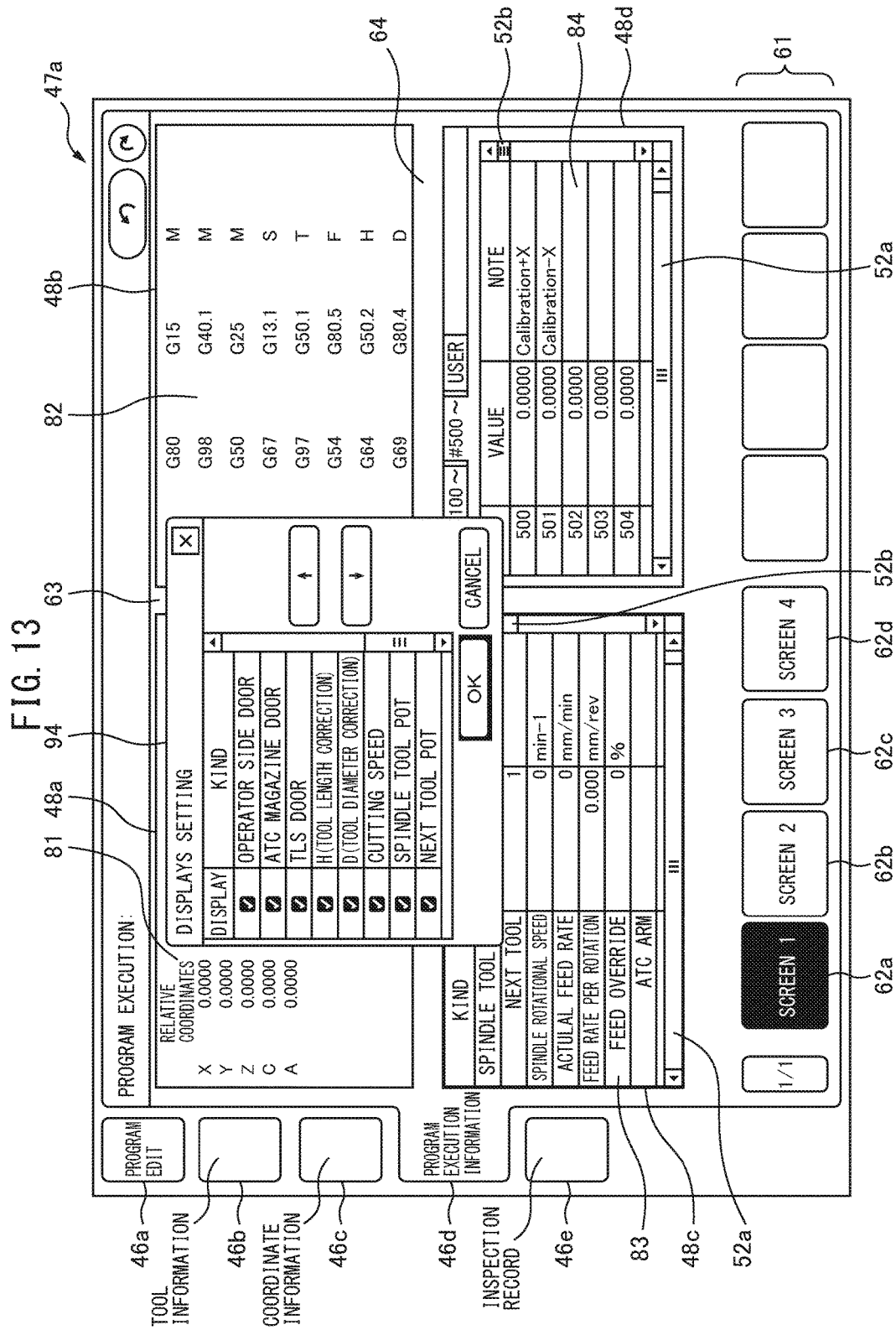
FIG. 13 is the first execution information picture in which an auxiliary picture for setting display items of a machine information image is displayed.

Next, the machining information other than the current position information capable of being displayed in the execution information picture will be illustrated. FIG. 13 shows the first execution information picture in which an auxiliary picture for setting display items of the machine information image is displayed.

The machining information displayed in the partition areas 48a-48d include information displayed in an image in a table format. For example, in the third partition area 48c, the machine information image 83 is displayed in the table format. Also in such a machining information image displayed in the table format, by long pushing the inside of the partition area 48c so as to open first auxiliary picture, and further selecting the item of "display setting" in the first auxiliary picture, second auxiliary picture 94 can be displayed. Then, in the auxiliary picture 94, the display items and the display order can be set.

Figure 14:
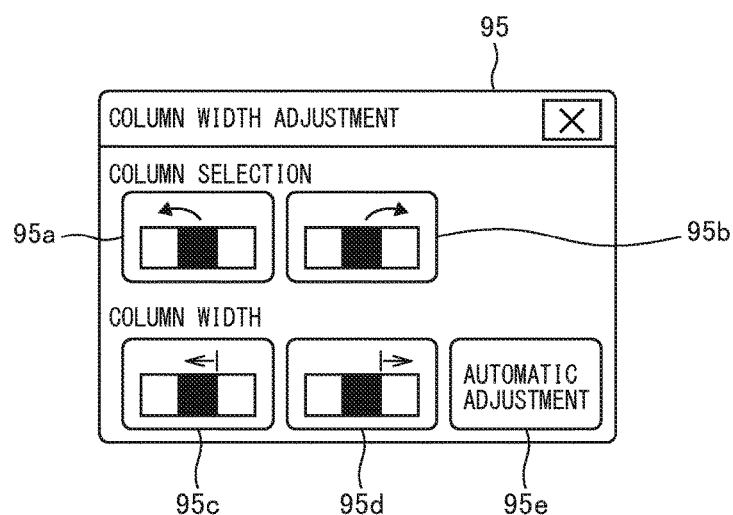
FIG. 14 illustrates an auxiliary picture for adjusting a column width of the machine information image.

FIG. 14 shows an auxiliary picture for adjusting a column width of a machining information table displayed in the table format. By long pushing the inside of the partition area 48c so as to open the first auxiliary picture, and further selecting a predetermined item in the first auxiliary picture, second auxiliary picture 95 can be displayed. A cell for changing the column width can be selected by pushing buttons 95a, 95b in the auxiliary picture 95. Then, the column width can be adjusted by pushing buttons 95c, 95d. Alternatively, the column width can be automatically adjusted by pushing the button 95e so that in all the cells, character strings are displayed inside the cells. Thus, in the table format image, the column width can be adjusted.

As the machining information displayed in the table format image, the macro-variable information image 84 displayed in the fourth partition area 48d in FIG. 13 can be illustrated in addition to the machine information image 83. Further, the production count information image and the modal information image can be illustrated.

In the present embodiment, the character size and a grid height of the table format image can be changed in an initial setting picture. When the character size and the grid height are set in the initial setting picture, an initial setting value is maintained. Also when the size of the partition area is changed so that a lateral width or a height of the table format image becomes greater than the partition area, the character size and the grid height are maintained. When the lateral width of the image becomes greater than the lateral width of the partition area, a scroll bar 52a which horizontally moves the image is displayed. The scroll bar 52a is displayed in a lower portion of the partition area. When the height of the image becomes greater than a height of the partition area, the scroll bar 52b which vertically moves the image is displayed. By moving the scroll bars 52a, 52b, the whole image can be confirmed.

Figure 15:
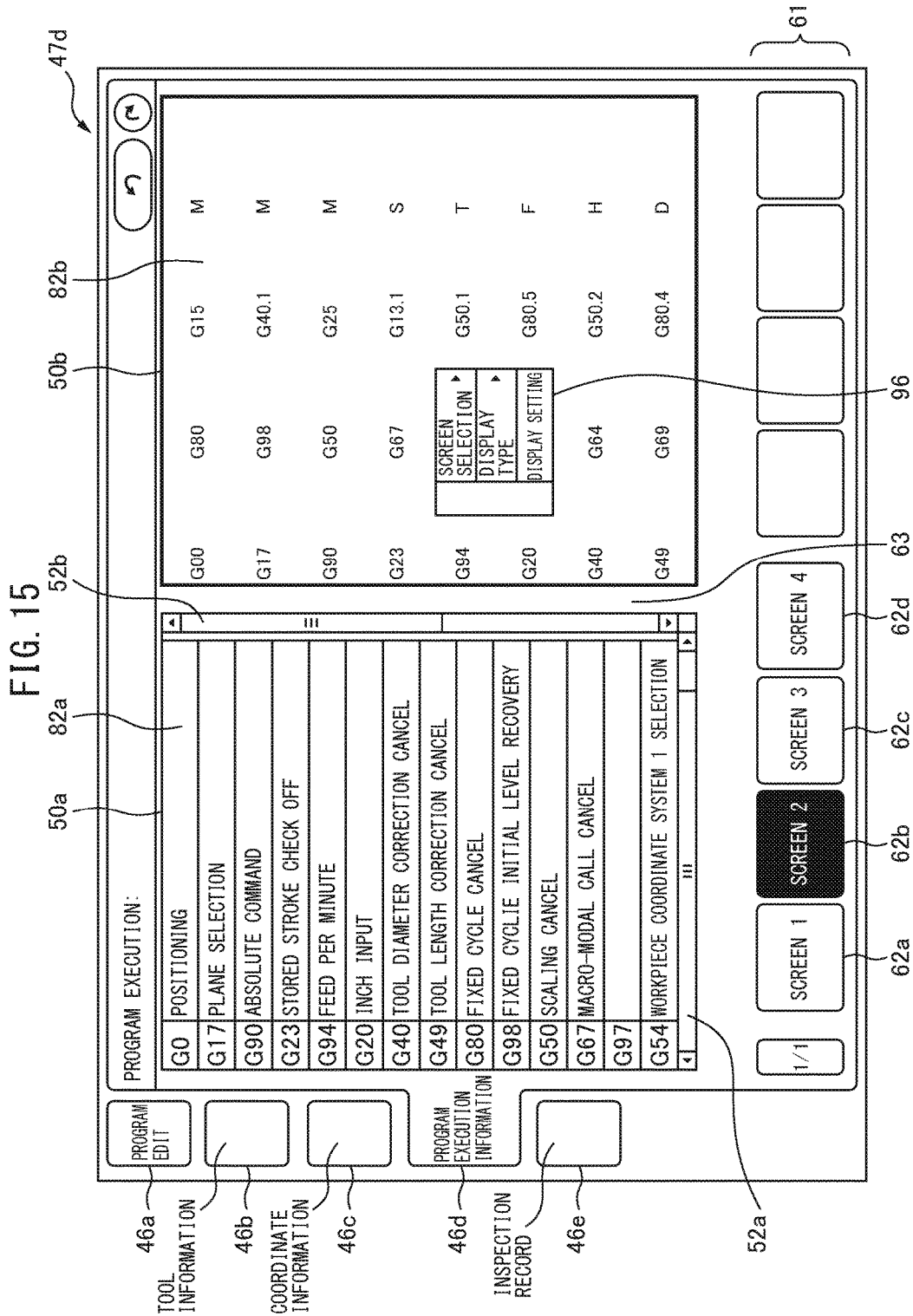
FIG. 15 is fourth execution information picture according to the embodiment.

FIG. 15 shows fourth execution information picture according to the present embodiment. In fourth execution information picture 47d, a switch button 62b in the button area 61 is selected so that second selection picture is displayed. In the fourth execution information picture 47d, the display area of the display part is partitioned into two pieces. In first partition area 50a and second partition area 50b, modal information images 82a, 82b containing the pieces of modal information are displayed. In the modal information image 82a, the modal information is displayed in the table format. Meanwhile, in the modal information image 82b, the same modal information is displayed in an image using a character string.

Thus, when one piece of the machining information is displayed, display can be made using a plurality of display methods. When the display methods are changed, for example, by long pushing the modal information image 82b inside the partition area 50b, first auxiliary picture 96 can be displayed. By pushing the item of "display setting" displayed in the auxiliary picture 96, a display method using character string and a display method using table format can be switched.

In the present embodiment, in the display method using a character string such as the modal information image 82b, even if the size of the partition area 50b is changed, the character size is unchanged and maintained to be constant. In the modal information image 82b, a character string is displayed in accordance with a lateral width of the partition area 50b. When a height of the partition area 50b is smaller than a height of the modal information image 82b, a scroll bar for vertically moving the image is displayed. As the machining information displayed in the image using a character string, in addition to the modal information image, an image of the machining program can be illustrated.

Figure 16:
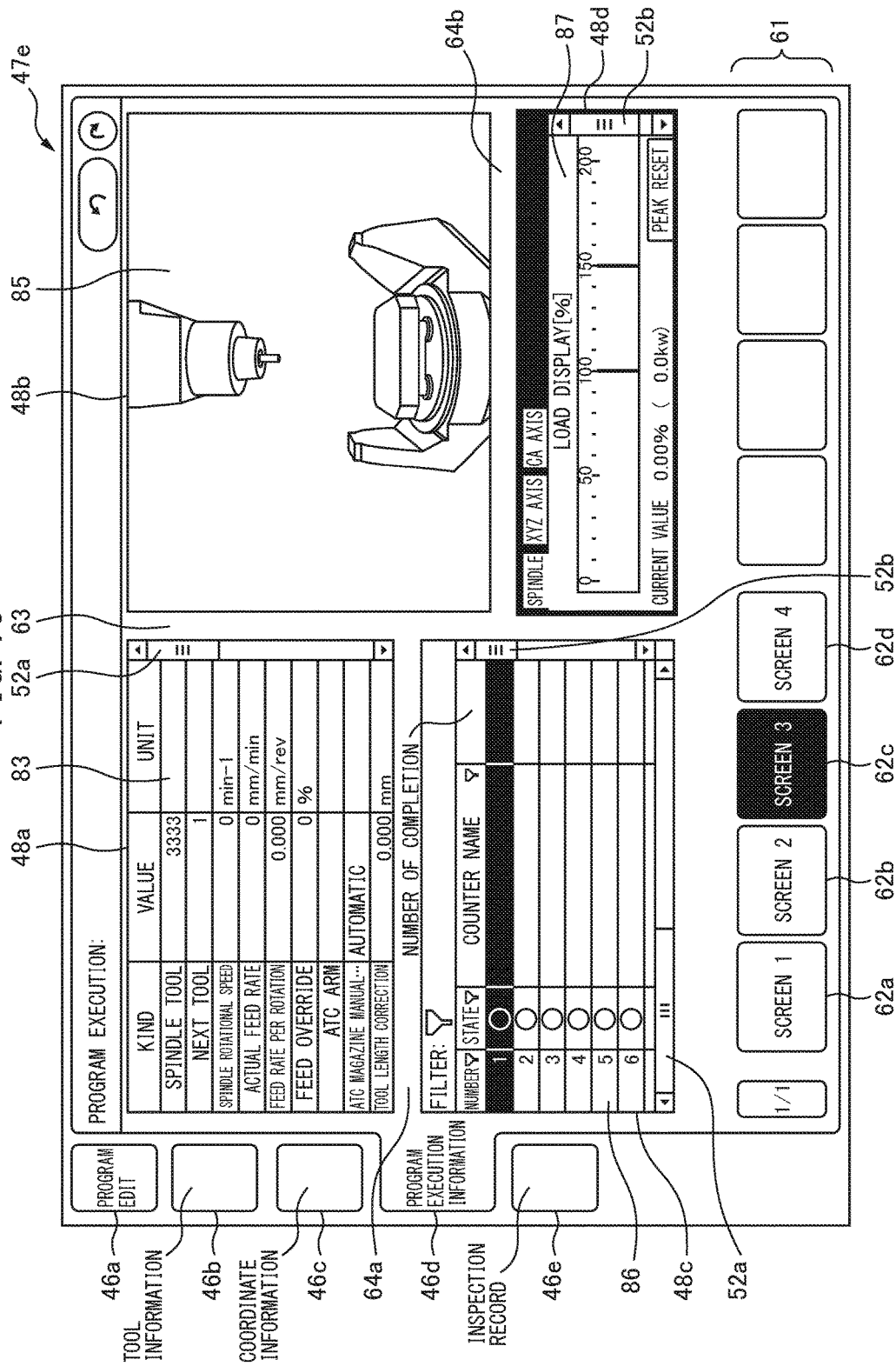
FIG. 16 is fifth execution information picture according to the embodiment.

FIG. 16 shows fifth execution information picture according to the present embodiment. In fifth execution information picture 47e, a switch button 62c in the button area 61 is selected so that third selection picture is displayed. In the fifth execution information picture 47e, positions of the splitters 63, 64a, 64b are adjusted in such a manner that the sizes of the four partition areas 48a-48d are different from each other.

In the first partition area 48a, the machine information image 83 is displayed. In the third partition area 48c, a production count information image 86 is displayed in the table format. In the second partition area 48b, a machining room animation image 85 is displayed. The machining room animation image 85 is a schematic diagram in which the inside of the machining room is seen from a desired point.

Similarly to the machining room animation image, as the machining information, a captured image and information containing a diagram can be displayed. For example, an image and a picture by the camera in the machining room or animations in the machining room correspond to the machining information including a captured image and a diagram. For example, with reference to FIG. 1, an image captured by each type of camera 32 can be displayed in the partition area. As each type of camera 32, an arbitrary camera which captures a part regarding machining of the workpiece can be employed. For example, a camera mounted to a workpiece replacement device or a tool replacement device can be employed as each type of camera 32 in addition to a camera installed in the machining room. The image displayed in the partition area may be a static image or an animated image.

With reference to FIG. 16, when the size of the partition area 48b changes, the image in which the information including a captured image or a diagram is displayed can be enlarged or reduced so as to correspond to the size of the partition area 48b. Meanwhile, a ratio of a vertical length to a horizontal length of the image can be unchanged and maintained.

In the fourth partition area 48d, a load information image 87 is displayed. As the machining information, information including a graph can be displayed. In the load information image 87, a graph of the load applied to the spindle is displayed as a main image.

In the picture mainly having the graph, even if the size of the partition area 48d changes, the character size is maintained. In the graph, when the size of the partition area is changed, a vertical length or a horizontal length can be changed. In the load information image 87 according to the present embodiment, the load information image 87 is also horizontally enlarged or reduced in accordance with the lateral width of the partition area 48d. However, even if a height of the partition area 48d changes, the load information image 87 is unchanged in a vertical direction and maintained. When a height of the load information image 87 is greater than the height of the partition area 48d, the scroll bar 52b for vertically moving the image is displayed.

Thus, in the control device of the machine tool according to the present embodiment, the machining information can be displayed in the plurality of partition areas. The size of the partition areas can be continuously changed in accordance with an operation by the operator. Then, the display format of the machining information can be continuously changed in accordance with the size of the partition areas and the machining information to be displayed. Accordingly, the operator can easily and accurately confirm the machining information.

Note that in the first execution information picture 47a in FIG. 4, the switch button 62a in the button area 61 is selected so that the first selection picture is displayed. In the fourth execution information picture 47d in FIG. 15, the switch button 62b is selected so that the second selection picture is displayed. In the fifth execution information picture 47e in FIG. 16, the switch button 62c is selected so that the third selection picture is displayed. The control device according to the present embodiment can switch from the first selection picture to the fourth selection picture by selecting the switch buttons 62a-62d. In each selection picture, the execution information picture in which a partition method of the display area of the display part, a kind of the machining information, a display method of the machining information, and the like are separately set can be displayed.

The partition method of the display area of the selection picture, the kind of the machining information, the display method of the machining information, and the like can be stored in the storage part 26 as picture setting information. The storage part 26 can store plural pieces of picture setting information for each selection picture. The display control part 22 can switch the selection picture based on the picture setting information as stored by an operation of the switch buttons 62a-62d by the operator.

The operator can set in advance the plurality of selection pictures switched in accordance with progress of a machining step. For example, immediately before starting machining, to confirm a state of the machining program, the coordinate systems, and the machine tool, images thereof can be set in the first selection picture. In the second selection picture and the third selection picture, images of the modal information, the current position information, the load information, and the like can be set as information during machining. In the fourth selection picture, a picture for confirming a whole step of the production count information and the like can be set.

The operator can display the execution information picture as desired by switching from the first selection picture to the fourth selection picture in accordance with progress of machining. Changing the size of the partition areas and the machining information displayed in the partition areas for each machining step is unrequired and the machining information as desired can be easily displayed in a desired display format.

Alternatively, the selection picture may be set in such a manner as to display the machining information as desired for each kind of machining of the workpiece. Alternatively, the control device can store the picture setting information for each operator. For example, first operator and second operator can store the picture setting information as desired in the storage part. When the machine tool is used, the execution information picture stored in the storage part can be displayed by inputting an operator number or the like.

Further, the control device can be formed in such a manner as to switch the selection picture by a code command of the machining program. For example, an M code for switching from the first selection picture to the second selection picture is determined in advance and such a code command is described in the machining program. Then, if machining progresses based on the machining program and the control device detects the code command for switching the selection picture, automatic switch of the picture can be made.

In the present embodiment, the execution information picture has been described by way of example among pictures displayed in the display part, but such a configuration is not limitative, and the partition areas can be generated in an arbitrary picture and a control similar to those as described above can be performed.

For example, with reference to FIG. 4, a program editing picture can be displayed by selecting the program editing tab 46a. The program editing picture is a picture for creating, displaying, and editing the machining program. A tool information picture can be displayed by selecting the tool information tab 46b. The tool information picture is a picture for inputting, displaying, and editing the tool information. A coordinate information picture is displayed by selecting the coordinate information tab 46c. The coordinate information picture is a picture for displaying and editing coordinate information. An inspection record picture can be displayed by selecting the inspection record tab 46e. The inspection record picture is a picture for inputting, displaying, or editing information on inspection performed in the machine tool.

In such pictures, an image in which coordinate values of the coordinate systems are displayed, a table format image, an image mainly having a graph, an image using a character string, and the like can be displayed so as to perform a display control similar to that in the present embodiment.

The embodiments as described above can be suitably combined. In each drawing as described above, the same or similar components are denoted with the same reference signs. Note that the embodiments as describe above are illustrative and should not limit the invention. Moreover, the embodiments include modifications of the embodiments recited in the claims.

REFERENCE SIGNS LIST

1 Machine tool
22 Display control part
23 Image generation part
26 Storage part
28 Display part
29 Manual input part
31 Each type of sensor
32 Each type of camera
42 Key input part
43 Override setting part
44 Operation switch part
45 Display panel
47a-47e Execution information picture
48a-48d, 50a, 50b Partition area
52a, 52b Scroll bar
62a-62d Switch button
63, 64, 64a, 64b Splitter
70 Control device
76 Machining program
81, 81a-81e Current position image

The invention claimed is:

1. A control device of a machine tool which machines a workpiece by relatively moving a tool and the workpiece, comprising:
    a display part which displays machining information associated with machining of the workpiece; and
    a display control part which generates an image to be displayed on the display part,
    wherein the display control part is formed in such a manner as to generate a plurality of partition areas by partitioning a display area of the display part and allow the machining information to be displayed in the partition areas,
    the partition areas each have a size capable of being changed in accordance with an operation by an operator,
    the display control part changes a display format of the machining information in accordance with the size of the partition areas and the machining information to be displayed,
    the machining information displayed in the partition areas includes current position information of a feed axis,
    the current position information of the feed axis includes at least one of a coordinate value of a machine coordinate system, a coordinate value of an absolute coordinate system, a coordinate value of a relative coordinate system, and a remaining movement amount, and
    the display control part displays a current position image containing the current position information of the feed axis in one of the partition areas and changes a character size to the maximum character size allowing all coordinate values of one coordinate system to be displayed, when a size of the one of the partition areas in which the current position image is displayed is changed, and
    when a lateral width of the partition area is smaller than a width allowing all of the coordinate systems to be displayed, the display control part changes display of the coordinate systems from one row to two rows, and further, when the lateral width of the partition area is smaller than a width allowing all of coordinate values in first row to be displayed, the display control part reduces the character size until all the coordinate values in the first row are displayed in the partition area.

2. The control device of the machine tool according to claim 1, further comprising a storage part which stores information on display of the display part, wherein
    the display control part can change a partition method of the display area of the display part and a kind of the machining information to be displayed in the partition area,
    the storage part stores plural pieces of picture setting information including the partition method of the display area of the display part and the kind of the machining information, and
    the display control part switches a picture based on the plural pieces of picture setting information through a switch button operation by the operator.

3. The control device of the machine tool according to claim 1, further comprising a storage part which stores information on display of the display part, wherein
    the display control part may change a partition method of the display area of the display part and a kind of the machining information to be displayed in the partition area,
    the storage part stores plural pieces of picture setting information including the partition method of the display area of the display part and the kind of the machining information, and
    the display control part switches a picture based on the plural pieces of picture setting information through a code command of the machining program.

4. A control device of a machine tool which machines a workpiece by relatively moving a tool and the workpiece, comprising:
    a display part which displays machining information associated with machining of the workpiece; and
    a display control part which generates an image to be displayed on the display part,
    wherein the display control part is formed in such a manner as to generate a plurality of partition areas by partitioning a display area of the display part in accordance with a predetermined number of partitions, display a splitter at a border of the partition areas, and allows a current position image containing current position information of a feed axis to be displayed,
    the partition area has areas each have a size capable of being continuously changed by moving the splitter through a touch panel or a pointing device,
    the current position information of the feed axis includes at least one of a coordinate value of a machine coordinate system, a coordinate value of an absolute coordinate system, a coordinate value of a relative coordinate system, and a remaining movement amount, and
    when a size of one of the partition areas in which the current position image is displayed is changed, the display control part changes a character size to the maximum character size allowing all coordinate values of one coordinate system to be displayed, in accordance with the size of the partition area, and
    when a lateral width of the partition area is smaller than a width allowing all of the coordinate systems to be displayed, the display control part changes display of the coordinate systems from one row to two rows, and further, when the lateral width of the partition area is smaller than a width allowing all of coordinate values in first row to be displayed, the display control part reduces the character size until all the coordinate values in the first row are displayed in the partition area.

* * * * *